(12) United States Patent
Baloga et al.

(10) Patent No.: US 6,209,957 B1
(45) Date of Patent: Apr. 3, 2001

(54) CHILD SAFETY SEAT

(75) Inventors: Thomas Charles Baloga, Fort Mill, SC (US); David William Burleigh, Bognor Regis (GB)

(73) Assignee: Britax Child Safety Inc., Fort Mill, SC (US)

( * ) Notice: Subject to any disclaimer, the term of this patent is extended or adjusted under 35 U.S.C. 154(b) by 0 days.

(21) Appl. No.: 09/584,274

(22) Filed: May 31, 2000

Related U.S. Application Data

(60) Provisional application No. 60/138,457, filed on Jun. 10, 1999.

(51) Int. Cl.$^7$ .................................................. A47D 1/10
(52) U.S. Cl. ........................................ 297/253; 297/250.1
(58) Field of Search .................................. 297/250.1, 253

(56) References Cited

U.S. PATENT DOCUMENTS

| | | | |
|---|---|---|---|
| 5,186,520 | 2/1993 | Whitaker et al. ..................... | 297/468 |
| 5,383,708 | * 1/1995 | Nagasaka et al. . | |
| 5,487,588 | * 1/1996 | Burleigh et al. . | |
| 5,695,243 | * 12/1997 | Anthony et al. . | |
| 5,797,654 | * 8/1998 | Stroud . | |
| 5,979,982 | * 11/1999 | Nakagawa . | |
| 6,017,087 | * 1/2000 | Anthony et al. . | |

FOREIGN PATENT DOCUMENTS

| | | |
|---|---|---|
| 23 57 307 | 5/1975 | (DE) . |
| 34 22 695 A1 | 12/1985 | (DE) . |
| 0 619 202 A1 | 10/1994 | (EP) . |
| 0 747 258 A1 | 12/1996 | (EP) . |
| 1173891 | 12/1969 | (GB) . |
| 2 143 727 | 2/1985 | (GB) . |

* cited by examiner

Primary Examiner—Milton Nelson, Jr.
(74) Attorney, Agent, or Firm—Davis & Bujold, P.L.L.C.

(57) ABSTRACT

A child safety seat has a seat body with first and second side zones, a first abutment zone extending between the side zones for resting on a seat cushion of a vehicle seat and a second abutment zone extending between the side zones for abutting against a seat back of said vehicle seat. Each side zone carries a strap guide mounted in proximity to both the first abutment zone and the second abutment zone. A strap extends from a strap anchorage mounted on the side zone and located on the opposite side of the strap guide to the abutment zones. The strap extends through each strap guide to a releasable connector for engagement with an anchorage on the vehicle seat. The strap has an adjustment mechanism located on the opposite side of the strap guide to the releasable connector for adjusting the length of strap between such releasable connector and the corresponding strap guide.

20 Claims, 7 Drawing Sheets

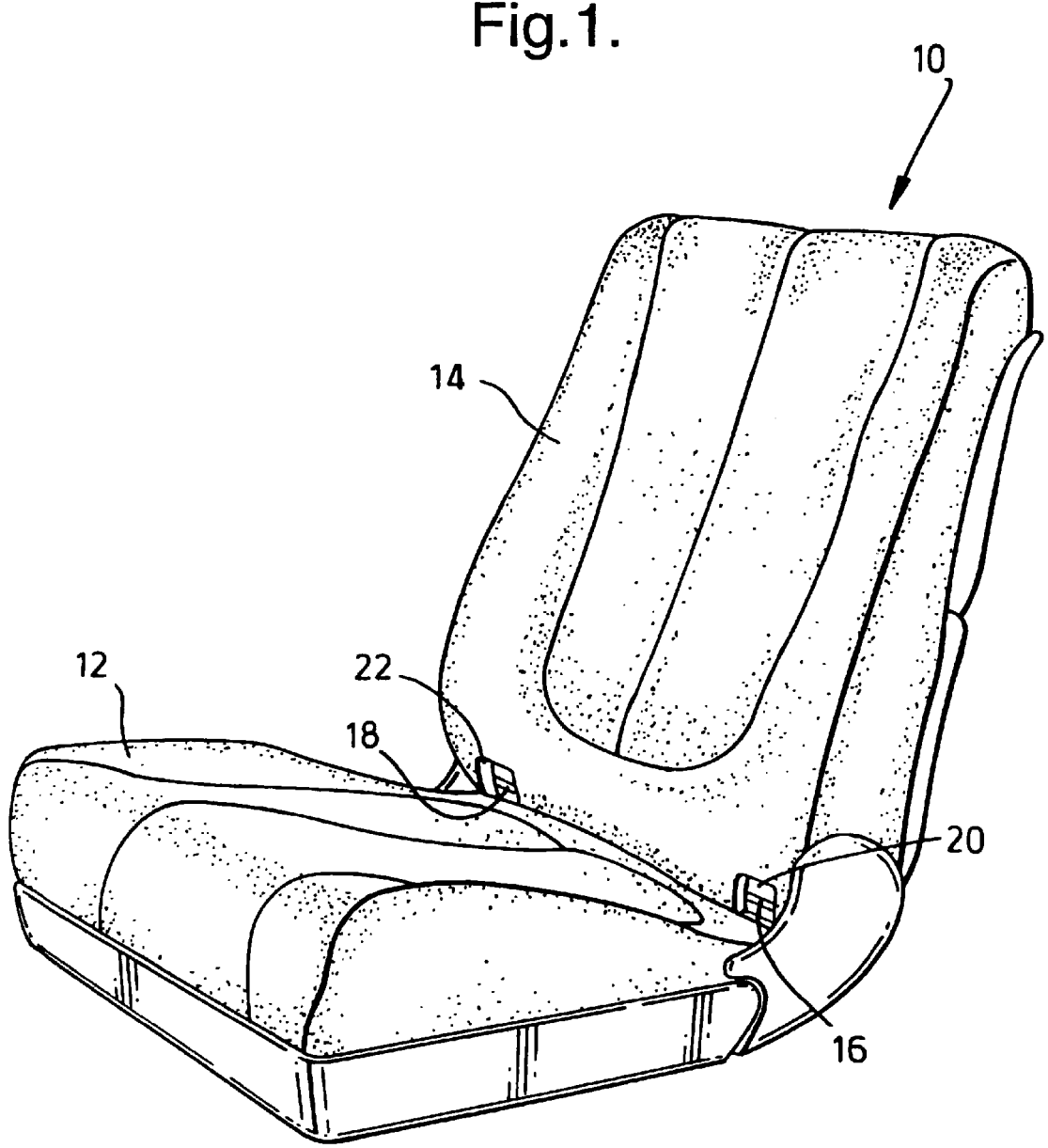

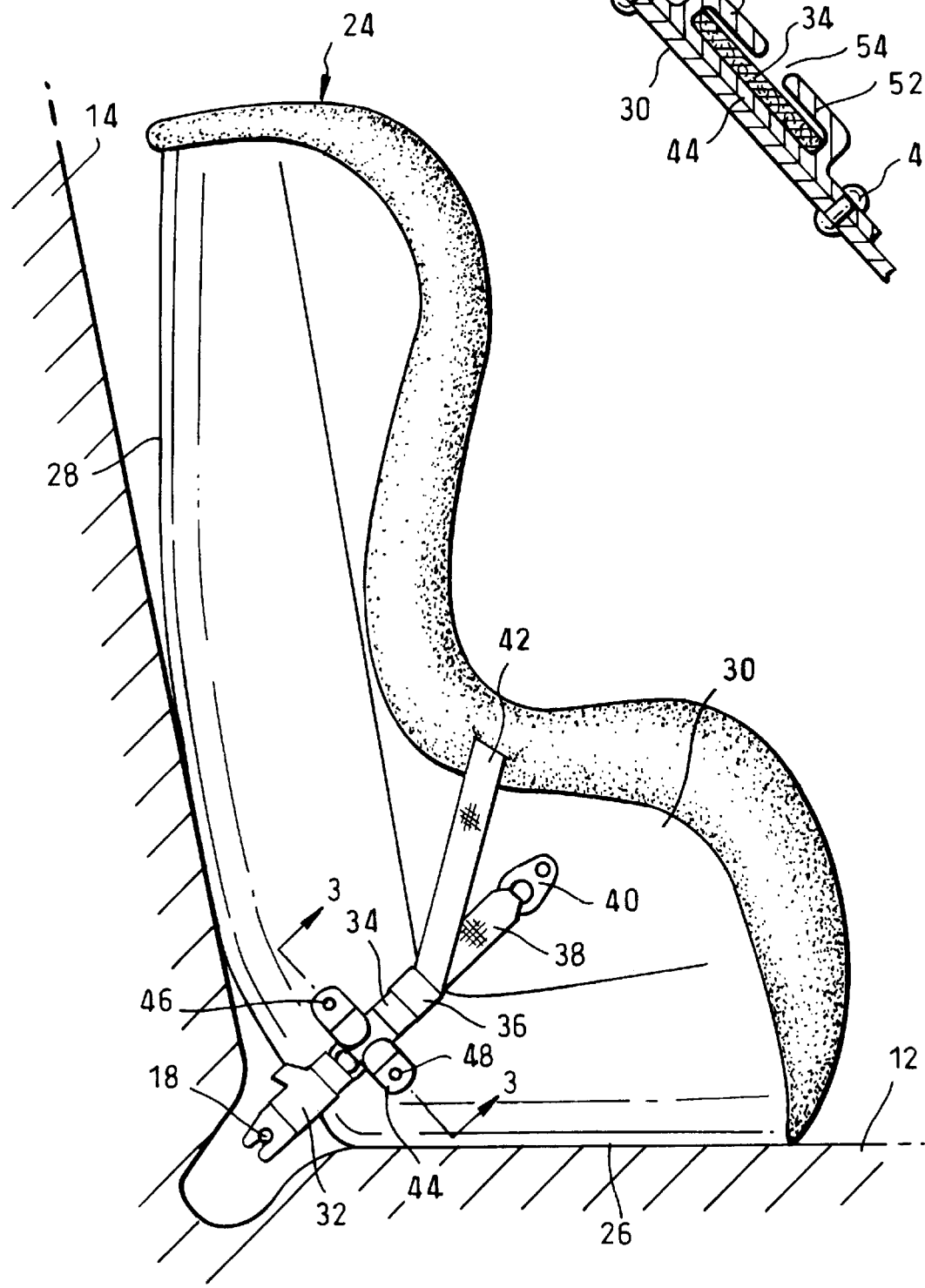
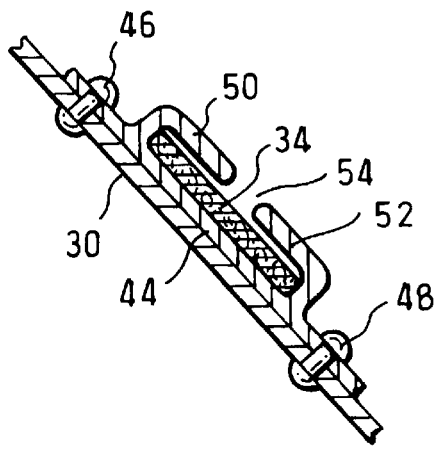

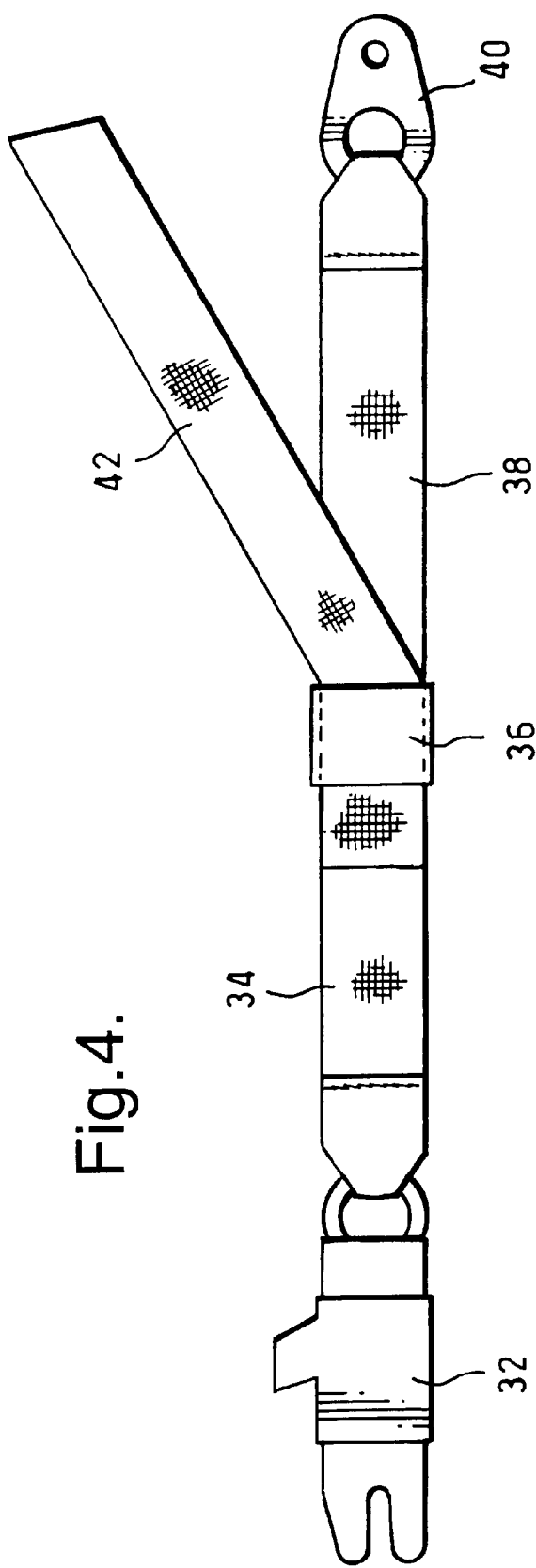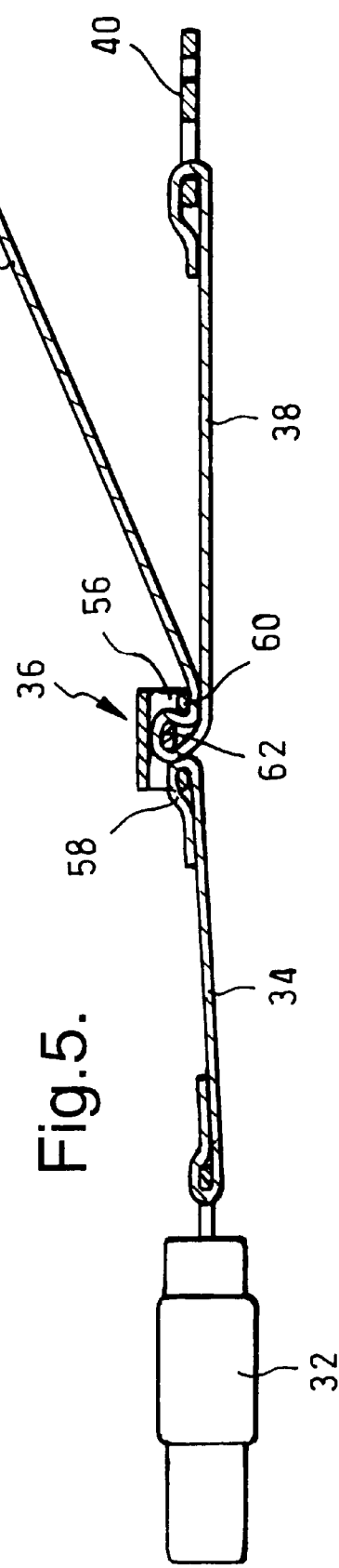

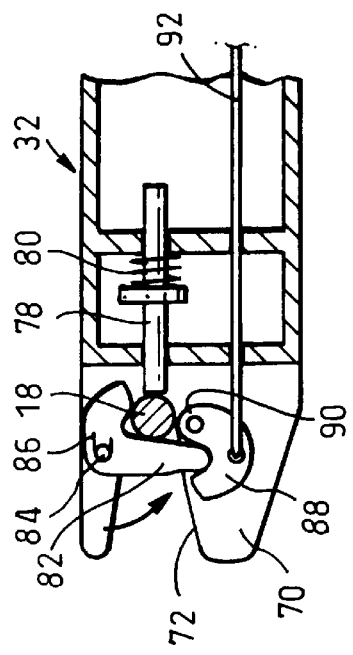
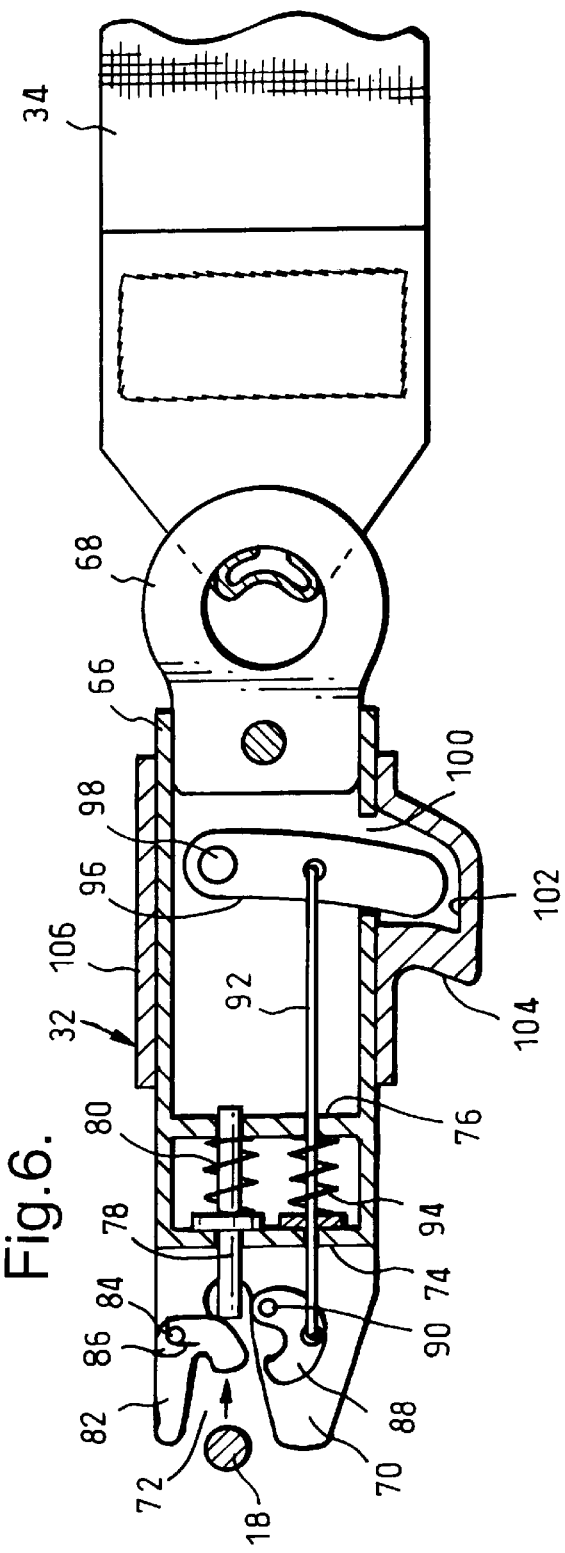

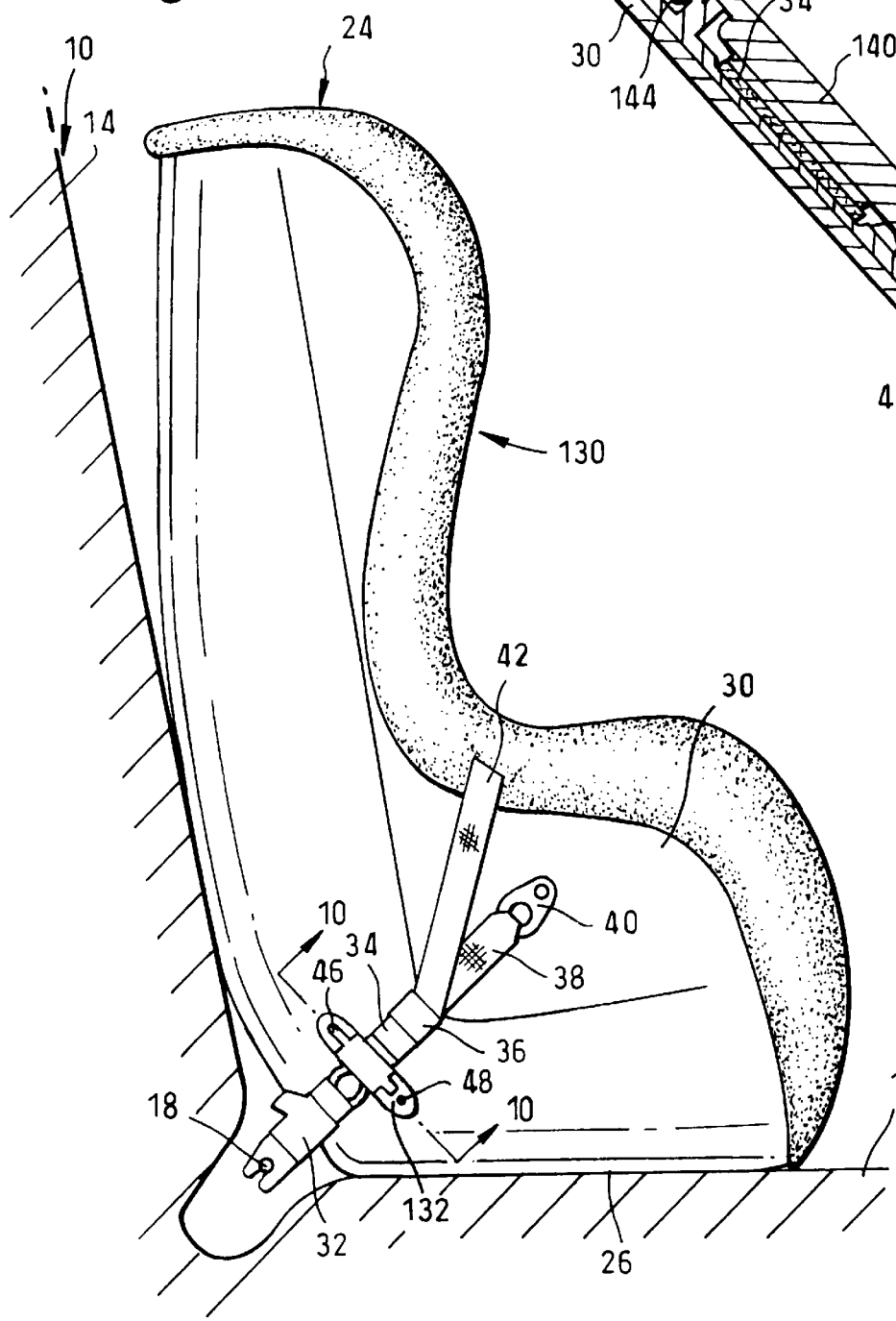

CHILD SAFETY SEAT

This application claims benefit of Provisional No. 60/138,457 filed Jun. 10, 1999.

FIELD

This invention relates to a child safety seat for use in a vehicle.

RELATED ART

It is well known for a child safety seat to rest on a vehicle seat and to be secured thereon by the corresponding vehicle seat belt. The disadvantage of this arrangement is that, even if the vehicle seat belt is pulled very tight during installation, the resilience of the belt will permit undesirable movement of the child seat relative to the vehicle in the event of sudden deceleration, for example during an accident. In order to overcome this disadvantage, it has been proposed to provide vehicle seats with standard anchorage units at agreed locations near the rear edge of the vehicle seat cushion and the bottom of the vehicle seat back for engagement by releasable connectors which are attached to the child seat, either rigidly or by relatively short straps. Such anchorage units will be referred to hereinafter as "standard anchorage units".

When flexible straps are used to attach a child safety seat to standard anchorage units, the length of the strap must be sufficient to accommodate a strap adjuster to enable the strap to be tightened after the releasable connector has engaged with the corresponding standard anchorage units. On the other hand, in order to minimise angular movement of the child safety seat relative to the standard anchorage unit, transverse movement of the releasable connector relative to the child seat must be minimised.

SUMMARY OF THE INVENTION

According to the invention, a child safety seat comprises a seat body having first and second side surfaces, a first abutment surface extending between the side surfaces and adapted to abut against a seat cushion of a vehicle seat and a second abutment surface extending between the side surfaces and adapted to abut against a seat back of said vehicle seat, first and second strap guides each mounted on a respective side surface in proximity to both the first abutment surface and the second abutment surface, first and second strap anchorages each mounted on a respective side surface on the opposite side of the corresponding strap guide to the abutment surfaces, first and second straps each having a releasable connector on one end and each extending through a respective strap guide to the corresponding anchorage, and a strap adjustment mechanism located on the opposite side of the strap guide to the releasable connector for adjusting the length of strap between such releasable connector and the corresponding strap guide.

In one form of the invention, the adjustment mechanism comprises a respective strap adjuster for each strap located in the portion of such strap extending between the strap guide and the strap anchorage. Alternatively, each strap anchorage may be mounted on the seat body by adjustable mounting means permitting variation of its distance from the corresponding strap guide.

BRIEF DESCRIPTION OF THE DRAWINGS

FIG. 1 is a perspective view of a vehicle seat suitable for receiving a child safety seat in accordance with the invention;

FIG. 2 is a side view of a first embodiment of the invention, mounted on the seat shown in FIG. 1;

FIG. 3 is a cross-sectional view on the line 3—3 in FIG. 2;

FIG. 4 is a plan view of an assembly comprising a releasable connector and a strap for use with the child seat shown in FIGS. 2 and 3;

FIG. 5 is a longitudinal sectional view of the assembly shown in FIG. 4;

FIG. 6 is a sectional view of the releasable connector of the assembly shown in FIGS. 4 and 5 with the mechanism in the released condition;

FIG. 7 is a scrap cross-sectional view, similar to FIG. 6, but showing the releasable connector in its engaged condition;

FIG. 9 is a side view, similar to FIG. 2, of a third embodiment of the invention;

FIG. 10 is a cross-sectional view taken on the line 10—10 in FIG. 9;

DETAILED DESCRIPTION OF THE PREFERRED EMBODIMENT

Figure 8:
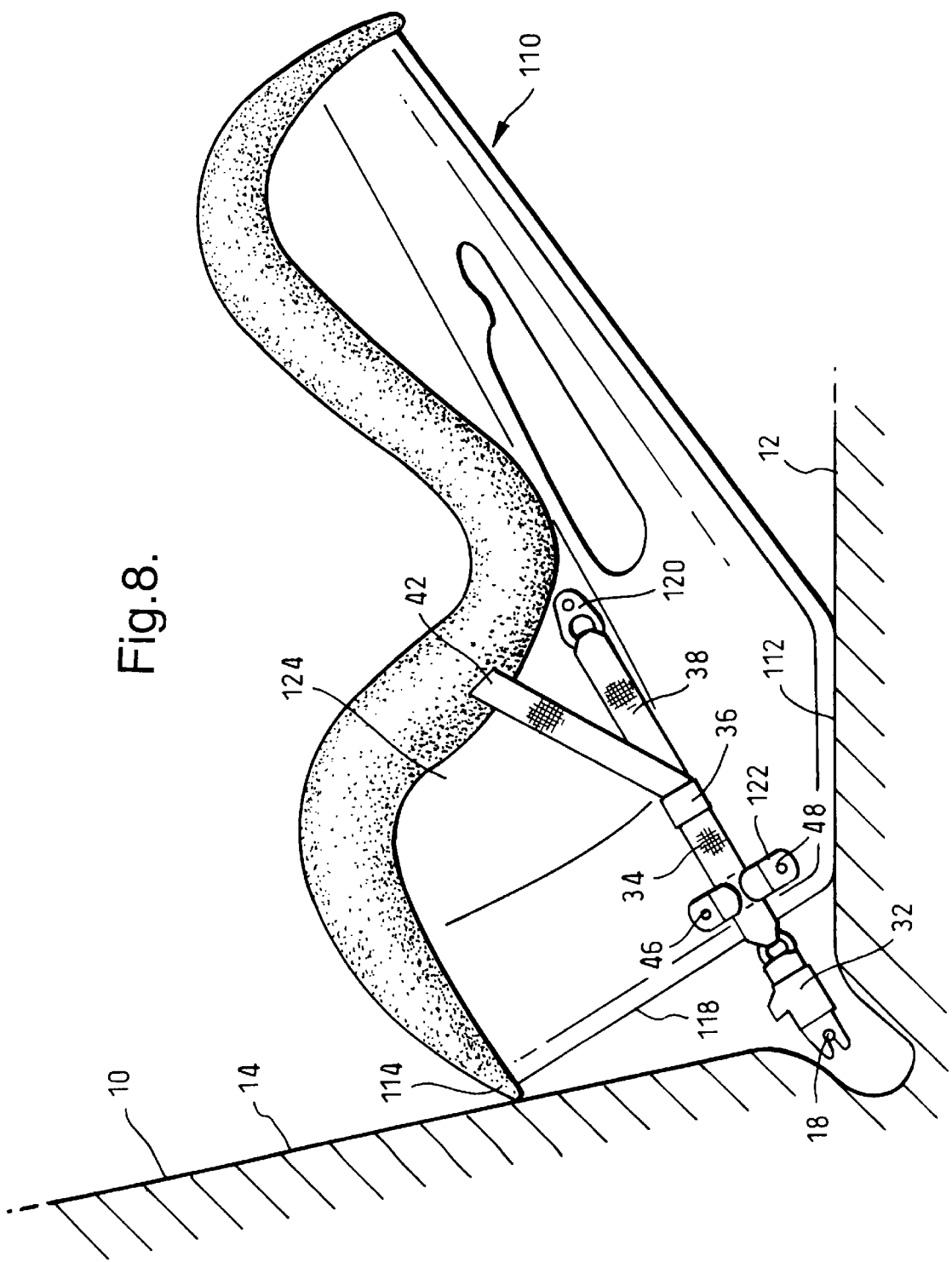
FIG. 8 is a side view, similar to FIG. 2, of a second embodiment of the invention.

FIG. 1 shows a vehicle seat 10 comprising a seat cushion 12, a backrest 14 and two standard anchorage units comprising transverse rods 16 and 18 which are accessible through openings 20 and 22 in the bottom of the backrest 14 and which are rigidly secured to the frame (not shown) of the seat 10.

FIG. 2 shows a forward-facing child seat in accordance with the invention comprising a seat body 24 having a seat portion 26 resting on the seat cushion 12 of the vehicle seat 10, and a backrest 28 abutting against the backrest 14 of the vehicle seat 10. The seat body 12 also has a side wall 30 together with another side wall which is not visible in the drawing.

A releasable connector 32 engages with the standard anchorage unit 18. The connector 32 is attached by a first strap 34 to a strap adjuster 36. A second strap 38 has one end secured to the side wall 30 of the child seat 24 by a strap anchorage 40. The other end 42 of the second strap 38 is threaded through the strap adjuster 36, as will be explained in more detail hereinafter. The first strap 34 is threaded through a strap guide 44 which is secured to the side wall 30 by rivets 46 and 48. As can be seen from FIG. 3, the strap guide 44 comprises two mutually confronting hook formations 50 and 52 with a central opening 54 therebetween through which the strap can be inserted. The strap guide 44 prevents lateral movement of the strap 34. Consequently, any possibility of angular or upward movement of the child seat body 22 relative to the vehicle seat 10 is severely restricted, provided that the straps 34 and 38 are tightened by pulling on the free end 40.

The other side wall (not shown) on the other side of the child seat body 24 is a mirror image of the side wall 26 and has a similar strap arrangement with a releasable connector for engagement with the other standard anchorage unit 20.

FIGS. 4 and 5 show more detail of the connection of the straps 34 and 38 to the strap adjuster 36. The strap adjuster 36 comprises a U-shaped frame 56 with first and second fixed transverse bars 58 and 60 extending between its limbs. A third bar 62 is slidably mounted in slots in the limbs of the U-shaped frame 56 so as to be movable in a direction perpendicular to the fixed transverse bars 58 and 60 (i.e. parallel to the straps 34 and 38). The first strap 34 is permanently attached to the first transverse bar 58. The second strap 38 is wrapped round the third bar 62 and then passes between this bar 62 and the second fixed bar 60 so that the third movable bar 62 moves towards the second fixed bar 60 so as to lock the strap 38 when tension is applied to the end attached to the anchorage unit 40. Strap adjusters of this type are well known.

FIGS. 6 and 7 show the releasable connector 32 in more detail. The connector 32 has a body 66 with a ring 68 secured to one end, the first strap 34 being secured to the ring 68. Two mutually parallel side flanges 70 (only one of which is visible in the drawing) project from the other end of the body 36 and have a V-shaped opening 72 therein for receiving the bar of the standard anchorage unit 18. Inwardly of the flanges 70, the body 66 has a transverse end wall 74 and a transverse intermediate wall 76 parallel to the wall 74 but spaced therefrom. An ejector rod 78 is slidably mounted through these two walls 74 and 76 and is urged outwardly across the inner ends of the notches 72 by a compression spring 80. A generally L-shaped latch plate 82 is pivotally mounted on a pin 84 extending between the flanges 70 and biassed in the clockwise direction (as viewed in FIGS. 6 and 7) to the position illustrated in FIG. 6 by a spring 86. When the connector 32 is pushed against the anchorage unit 18, the latter engages with the shorter limb of the latch plate 82, causing it to rotate to the position shown in FIG. 7. The anchorage unit 18 now engages with the ejector rod 78, displacing it inwardly and compressing the spring 80. The latch plate 82 is held in this position by a catch plate 88, which is pivotally mounted on a pin 90 extending between the two flanges 82 and engages round the end of the longer limb of the latch plate 82. The catch plate 88 is pivotally coupled to one end of a connecting rod 92 which also extends through the walls 74 and 76 and which is biassed outwardly by a second compression spring 94, thus tending to rotate the catch plate 88 in the clockwise direction into a position in which it engages with the latch plate 82.

The other end of the connecting rod 92 is connected to a lever 96 which is mounted on a pivot pin 98 within the body of the connector 32. The free end of the lever 96 projects outwardly through a slot 100 in the side wall of the body of the connector 32 so as to engage in a recess 102 in a finger grip 104 which is integrally formed with a sleeve 106. The sleeve 106 is slidably mounted on the outside of the body 32 so that displacement of the finger grip 104 to the right as viewed in the drawing causes the connecting rod 92 to rotate the catch plate 88 in the counter-clockwise direction so as to cause it disengage from the latch plate 82. The spring 86 then rotates the latch plate 82 in the clockwise direction back to the position illustrated in FIG. 6 as the ejector rod 78 pushes the connector 32 clear of the anchorage unit 18.

FIG. 8 shows a second embodiment of the invention comprising a rearward facing seat having a seat body 110 having a first abutment surface 112 near the bottom of its backrest, resting on the vehicle seat cushion and a second abutment surface 114 at the front edge of its seat portion 118 adapted to abut against the backrest 14 of the vehicle seat. The seat body 110 has a strap assembly including a strap anchorage 120 and a strap guide 122 on its side wall 124 which are identical to the strap anchorage 40 and the strap guide 44 of FIG. 2 but which are positioned at somewhat different locations. Associated with the strap anchorage 120 and strap guide 122 are a strap assembly comprising first and second straps 34 and 38, a strap adjuster 36 and a releasable connector 32 which engages with the anchorage unit 18. These components are identical with the correspondingly numbered components in FIGS. 2 and 3 and will not be described in detail. A similar strap assembly is mounted on the opposite side wall of the child seat body 110 for engagement with the other anchorage unit 20.

FIGS. 9 and 10 show a third embodiment of the invention comprising a forward facing seat having a seat body 130 which is identical with the seat body 24 of FIG. 2. The only difference is that the strap guide 44 of FIG. 2 is replaced by an alternative strap guide 132 which is shown in more detail in FIG. 10. The strap guide 132 comprises a static base part 134 which is secured to the side 130 of the seat by the rivets 44 and 46. On one side of the strap 34, the base part 134 has an upstanding projection 136 carrying a pivot pin 138 which engages in one end of a clamp bar 140. The other end of the clamp bar 140 comprises an integrally formed hand-grip portion 142. Adjacent to the hand-grip portion 142 is a hook formation 144 which engages with a complimentary formation on a projection 146 on the static base 134. When so engaged, the first strap 34 is clamped between the base part 134 and the clamp bar 140. The clamp bar 140 is formed of a material which is sufficiently resilient to allow bending of a reduced thickness portion 148 thereof so as to permit disengagement of the hook formation 144 from the projection 146. A similar strap guide is provided on the other side of the seat body 130.

Figure 11:
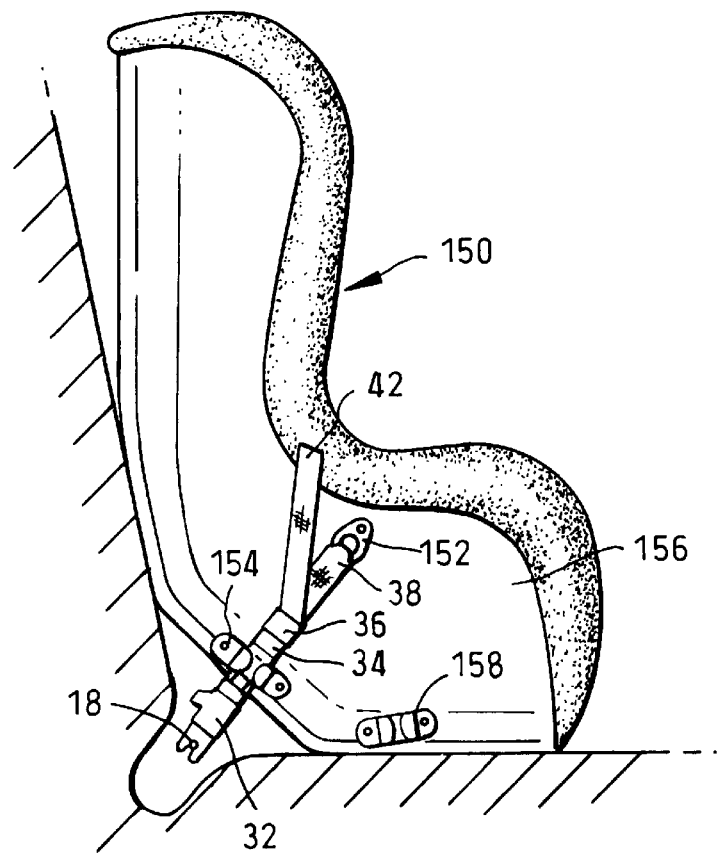
FIG. 11 is a side view, similar to FIG. 2, of a fourth embodiment of the invention, with the seat facing forwardly.
Figure 12:
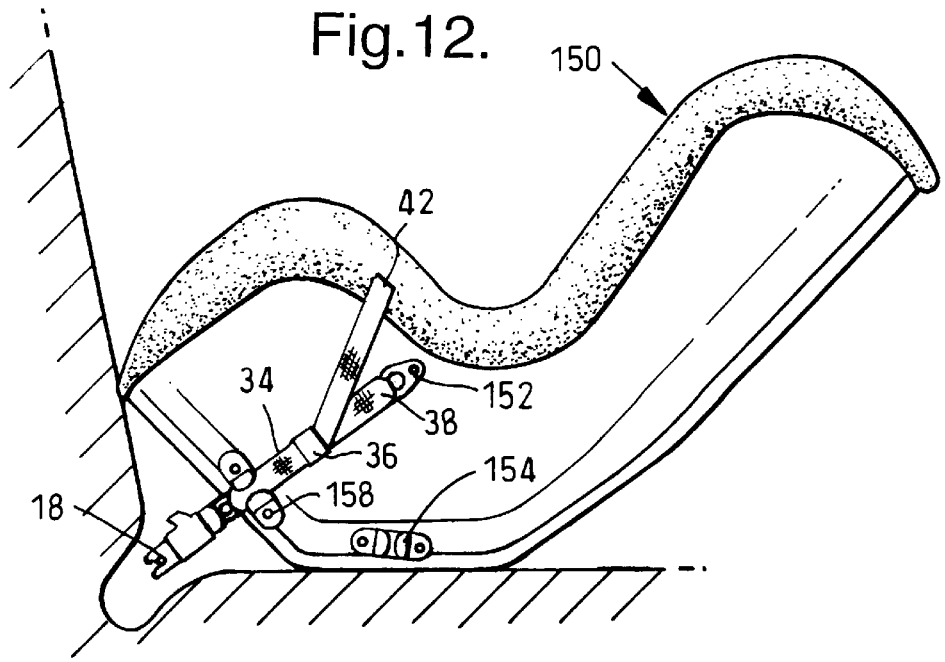
FIG. 12 is a side view of the embodiment shown in FIG. 11 but with the seat facing rearwardly.

FIG. 11 shows a fourth embodiment of the invention comprising a forward facing seat having a seat body 150 which is similar to the seat body 24 of FIG. 2 but shaped so that it can also be used facing rearwardly, as shown in FIG. 12. The seat body 150 has a strap assembly including a strap anchorage 152 and a strap guide 154 on its side wall 156 which are identical to the strap anchorage 40 and the strap guide 44 of FIGS. 2 and 3. Associated with the strap anchorage 152 and strap guide 154 are a strap assembly comprising first and second straps 34 and 38, a strap adjuster 36 and a releasable connector 32 which engages with the anchorage unit 18. These components are identical with the correspondingly numbered components in FIGS. 2 and 3 and will not be described in detail. A second strap guide 158, identical to the strap guide 154, is positioned on the side wall 156 for use when the seat body 150 is facing rearwardly, as shown in FIG. 12. A similar strap assembly is mounted on the opposite side wall of the child seat body 150 for engagement with the other anchorage unit 20.

The strap guides 154 and 158 may be replaced by strap guides of the type shown in FIG. 10.

For the avoidance of doubt, it is hereby confirmed that the term "comprising" is used herein to mean both "including" and "consisting of". The terms "comprise" and "comprises" have equivalent meanings.

What is claimed is:

1. A child safety seat comprising a seat body having first and second side zones, a first abutment zone extending between the side zones and adapted to abut against a seat cushion of a vehicle seat and a second abutment zone extending between the side zones and adapted to abut against a seat back of said vehicle seat, first and second strap guides each mounted on a respective side zone in proximity to both the first abutment zone and the second abutment zone, first and second strap anchorages each mounted on a respective side zone on the opposite side of the corresponding strap guide to the abutment zones, first and second straps each having a releasable connector on one end and each extending through a respective strap guide to the corresponding anchorage, and a strap adjustment mechanism located on the opposite side of the strap guide to the releasable connector for adjusting the length of strap between such releasable connector and the corresponding strap guide.

2. A child safety seat according to claim 1, wherein each strap anchorage is mounted on the seat body by adjustable mounting means permitting variation of its distance from the corresponding strap guide.

3. A child safety seat according to claim 2, wherein each strap guide comprises two mutually confronting hook formations with a central opening therebetween.

4. A child safety seat according to claim 2, wherein each strap guide comprises a base part, a clamp bar having a first end pivotally attached to a first end of the base part, and a hook formation at a second end of the base part adapted to engage with a second end of the clamp bar.

5. A child safety seat according to claim 2, wherein the strap guides are positioned on the side zones for use when the seat is oriented in a forward facing direction and second strap guides are positioned on the side zones for use when the seat is oriented in a rearward facing direction.

6. A child safety seat according to claim 1, wherein each strap guide comprises two mutually confronting hook formations with a central opening therebetween.

7. A child safety seat according to claim 1, wherein each strap guide comprises a base part, a clamp bar having a first end pivotally attached to a first end of the base part, and a hook formation at a second end of the base part adapted to engage with a second end of the clamp bar.

8. A child safety seat according to claim 1, wherein the strap guides are positioned on the side zones for use when the seat is oriented in a forward facing direction and second strap guides are positioned on the side zones for use when the seat is oriented in a rearward facing direction.

9. A child safety seat according to claim 1, wherein the adjustment mechanism comprises a respective strap adjuster for each strap operative on the portion of such strap extending between the strap guide and the strap anchorage.

10. A child safety seat according to claim 9, wherein each strap guide comprises two mutually confronting hook formations with a central opening therebetween.

11. A child safety seat according to claim 9, wherein each strap guide comprises a base part, a clamp bar having a first end pivotally attached to a first end of the base part, and a hook formation at a second end of the base part adapted to engage with a second end of the clamp bar.

12. A child safety seat according to claim 9, wherein the strap guides are positioned on the side zones for use when the seat is oriented in a forward facing direction and second strap guides are positioned on the side zones for use when the seat is oriented in a rearward facing direction.

13. A child safety seat according to claim 9, wherein each strap comprises a first strap part extending between the strap adjuster and the releasable connector, and a second strap part extending between the strap adjuster and the anchorage.

14. A child safety seat according to claim 13, wherein each strap guide comprises two mutually confronting hook formations with a central opening therebetween.

15. A child safety seat according to claim 13, wherein each strap guide comprises a base part, a clamp bar having a first end pivotally attached to a first end of the base part, and a hook formation at a second end of the base part adapted to engage with a second end of the clamp bar.

16. A child safety seat according to claim 13, wherein the strap guides are positioned on the side zones for use when the seat is oriented in a forward facing direction and second strap guides are positioned on the side zones for use when the seat is oriented in a rearward facing direction.

17. A child safety seat according to claim 13, wherein each strap adjuster comprises a frame having first and second fixed transverse bars and a third bar is slidably mounted on the frame so as to be movable in a direction perpendicular to the fixed transverse bars.

18. A child safety seat according to claim 17, wherein each strap guide comprises two mutually confronting hook formations with a central opening therebetween.

19. A child safety seat according to claim 17, wherein each strap guide comprises a base part, a clamp bar having a first end pivotally attached to a first end of the base part, and a hook formation at a second end of the base part adapted to engage with a second end of the clamp bar.

20. A child safety seat according to claim 17, wherein the strap guides are positioned on the side zones for use when the seat is oriented in a forward facing direction and second strap guides are positioned on the side zones for use when the seat is oriented in a rearward facing direction.

* * * * *